United States Patent
Davidson et al.

(10) Patent No.: US 12,311,585 B2
(45) Date of Patent: May 27, 2025

(54) METHODS FOR FABRICATING THERMOPLASTIC-BASED COMPOSITE SPOKES AND SPOKE ASSEMBLIES

(71) Applicant: Arris Composites Inc., Berkeley, CA (US)

(72) Inventors: Erick Davidson, Piedmont, CA (US); Zachary Aaron August, San Mateo, CA (US); Eric Forrester, El Cerrito, CA (US)

(73) Assignee: Arris Composites Inc., Berkeley, CA (US)

( * ) Notice: Subject to any disclaimer, the term of this patent is extended or adjusted under 35 U.S.C. 154(b) by 0 days.

(21) Appl. No.: 18/801,876

(22) Filed: Aug. 13, 2024

(65) Prior Publication Data

US 2025/0058504 A1    Feb. 20, 2025

Related U.S. Application Data

(60) Provisional application No. 63/532,560, filed on Aug. 14, 2023.

(51) Int. Cl.
| | | |
|---|---|---|
| B29C 45/14 | (2006.01) | |
| B29L 31/32 | (2006.01) | |
| B60B 1/04 | (2006.01) | |

(52) U.S. Cl.
CPC .. B29C 45/14426 (2013.01); B29C 45/14221 (2013.01); *B29L 2031/32* (2013.01); *B60B 1/041* (2013.01); *B60B 2310/204* (2013.01); *B60B 2360/341* (2013.01)

(58) Field of Classification Search
CPC ......... B29C 45/14426; B29C 45/14221; B29L 2031/32; B60B 1/041; B60B 2310/204; B60B 2360/341
See application file for complete search history.

(56) References Cited

U.S. PATENT DOCUMENTS

| | | | | |
|---|---|---|---|---|
| 2,356,585 | A | * 8/1944 | Hempel | ................. B29C 70/70 264/328.8 |
| 4,681,647 | A | 7/1987 | Kondo et al. | |
| 11,225,035 | B2 * | 1/2022 | Perkins | ................. B29C 70/30 |
| 2008/0265659 | A1 | 10/2008 | Heyse | |

FOREIGN PATENT DOCUMENTS

EP    3459759 B1    5/2018

OTHER PUBLICATIONS

International Search Report & Written Opinion mailed on Nov. 26, 2024 issued in PCT Patent Application No. PCT/US2024/042052.

* cited by examiner

*Primary Examiner* — Monica A Huson
(74) *Attorney, Agent, or Firm* — Kaplan Breyer Schwarz, LLP

(57) ABSTRACT

A method for fabricating thermoplastic bicycle spokes that securely couple to an end fitting, at one or both ends thereof, via a non-threaded, mechanical interlocking geometry. A spoke body is fabricated from thermoplastic resin, and then thermoplastic material is added, in situ (using the internal geometry of the end fitting as a form). This increases the effective diameter of the spoke at at least one end thereof to create an engagement feature that is adapted to interlock with the internal configuration of the end fitting. Additionally, by virtue of the method, the end of the spoke has a desirable fiber alignment, wherein the fibers substantially align with in-use loads.

30 Claims, 7 Drawing Sheets

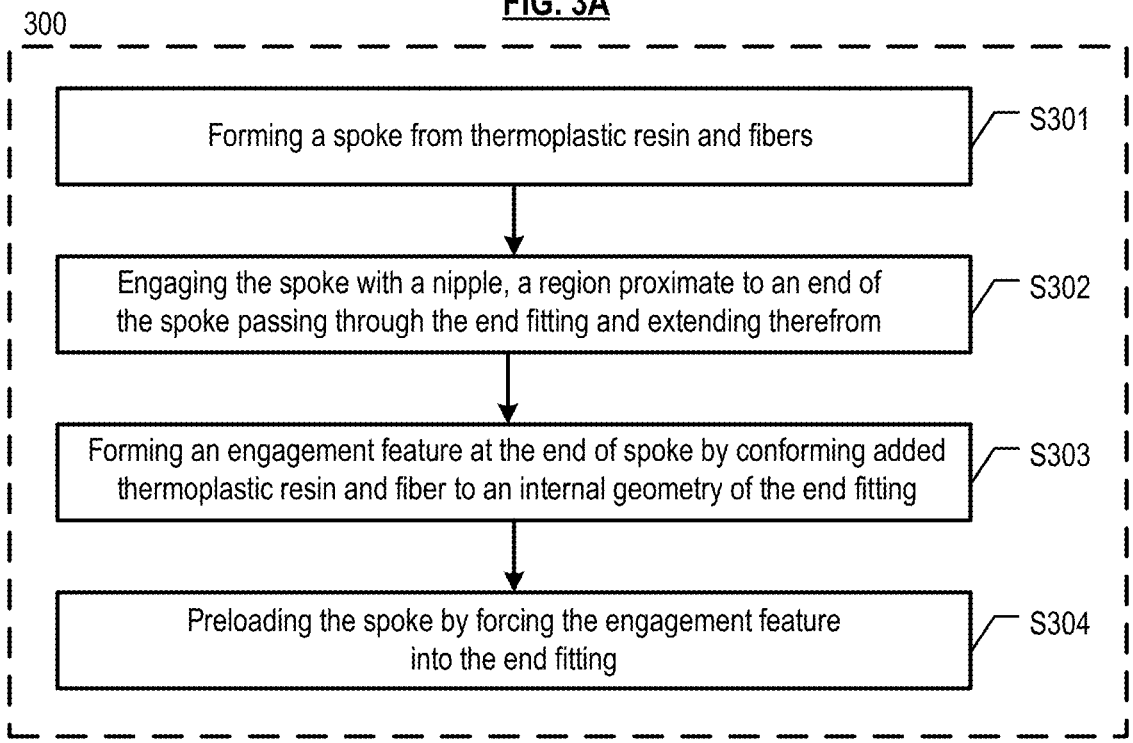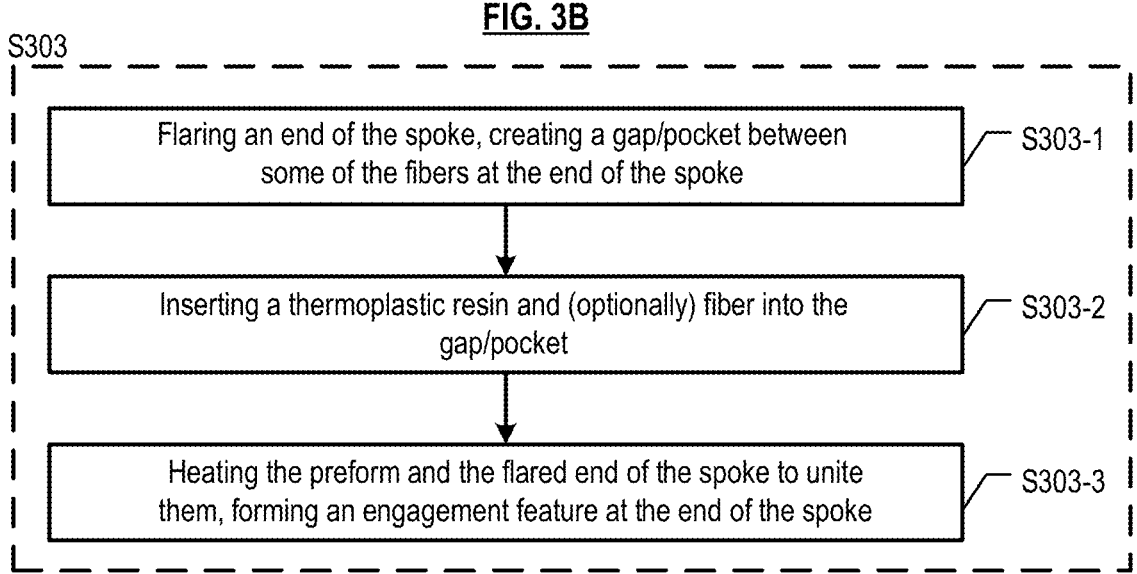

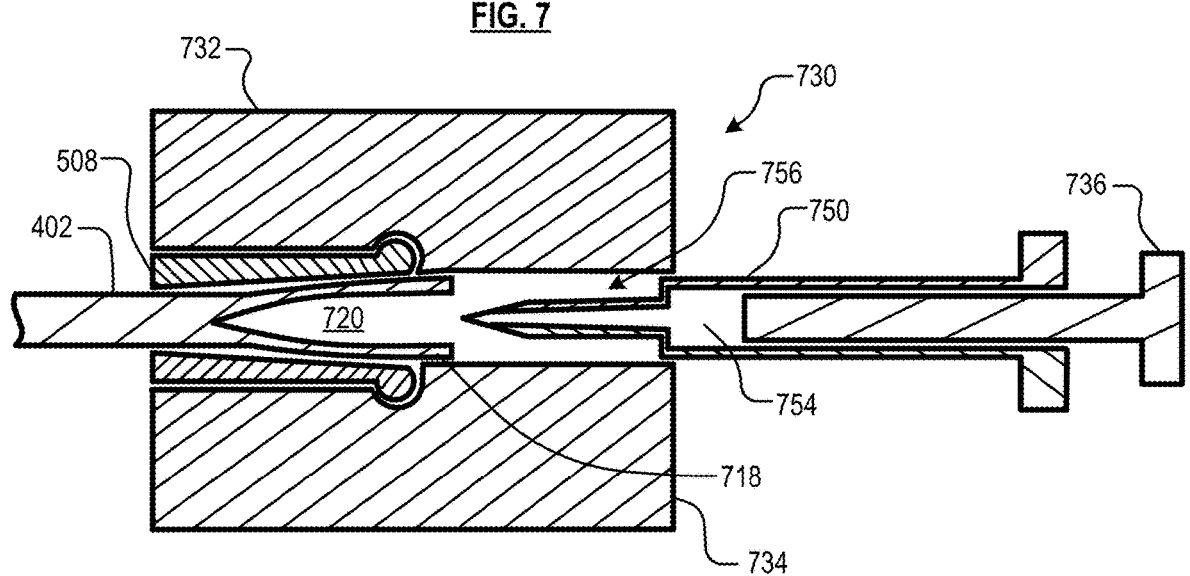
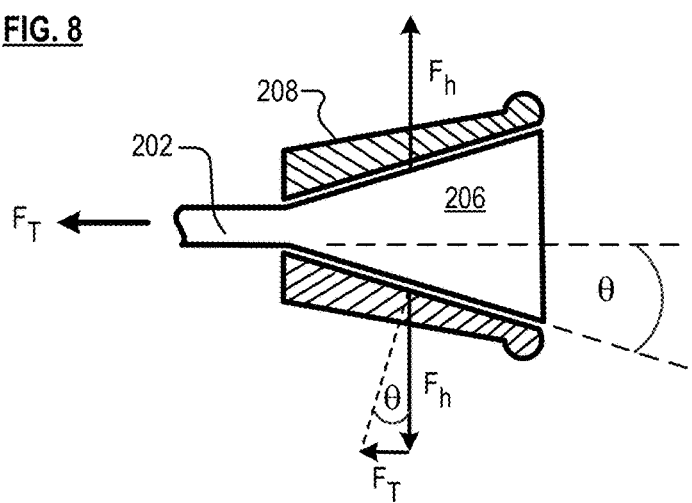

METHODS FOR FABRICATING THERMOPLASTIC-BASED COMPOSITE SPOKES AND SPOKE ASSEMBLIES

STATEMENT OF RELATED CASES

This specification claims priority to U.S. 63/532,560, filed Aug. 14, 2023, and which is incorporated by reference herein.

FIELD OF THE INVENTION

The present invention relates to bicycle spokes, and more particularly to a method for fabricating fiber-composite bicycle spokes.

BACKGROUND OF THE INVENTION

Many parts of a bicycle, such as the frame, front fork, wheels, and even drive-train components are now made from fiber-composite materials. The resin typically used for such composites has been thermoset polymers.

More recently, composite bicycle spokes are being offered. Bicycle spokes are loaded in tension during use, suspending the combined weight of the rider and the bicycle between the central hub and the wheel throughout the wheel's rotation. An end fitting is typically used to couple the spoke to wheel. When using metal-based spokes, the spokes are threaded into the end fitting to provide a robust interlock. That is, the fitting is internally threaded, wherein those threads engage a complementary set of threads on an end of the spoke, such that the spoke is "screwed" into the fitting. But such a threaded connection is not a viable approach for composite spokes, since the necessarily thin threads formed from a composite material are not robust enough for this use case.

SUMMARY OF THE INVENTION

The invention provides methods for fabricating composite bicycle spokes that avoid some of the drawbacks of the prior art. Embodiments of the invention provide methods for fabricating thermoplastic-based bicycle spokes that are physically adapted to securely couple, at one or both ends thereof, to an end fitting.

As noted above, since a threaded engagement is not a viable approach for coupling a fiber-composite spoke (either thermoset or thermoplastic) to a metal end fitting, the engagement is accomplished by some other type of interlocking geometry. In particular, at least one end of the composite spoke has a geometry that must facilitate mechanical interlock with a metal end fitting.

The fabrication process for existing composite spokes, which are based on thermoset resins, involves fabricating a (linear) spoke body, and then modifying the spoke-ends to provide a geometry that is capable of interlocking with the internal geometry of the end fitting. Thermosets necessarily undergo a "curing" step in which irreversible chemical changes-crosslinks between the resin molecules-occur. These chemical changes prevent reprocessing (re-melting) of the spoke. Consequently, modifying the end of a thermoset-based spoke to a geometry that mechanically couples to an end fitting typically requires the removal of material from the spoke (i.e., reductive post-shaping of the spoke-end). As such, the thermoset-based spoke can either be: a) molded with excess material at each end and have its ends ground to an appropriate shape, or b) molded with a uniform cross section from spoke end to spoke end, and have extra wraps of material added to the ends of the spoke after molding, wherein the extra material is then cured and ground to shape.

Either approach negatively impacts the cost and quality of the spoke. In particular, material-removal operations add to processing costs. And grinding the spoke-ends severs fibers unpredictably, thereby incurring spoke-to-spoke variation in stiffness. For a consistent ride, all spokes of a bicycle wheel should be in even tension, which is difficult to achieve with such stiffness variations.

The inventors realized that some of the drawbacks of the existing thermoset-based composite spokes could be overcome with the development of a thermoplastic-based composite spoke. Among other benefits, unlike thermosets, thermoplastic resins can be reprocessed (i.e., re-melted). This provides greater flexibility, relative to thermosets, in the methodologies used to create an interlocking geometry. That is, a thermoplastic-based spoke can be formed, and then partially melted, and then re-formed to create an interlocking geometry, wherein grinding to remove excess material may be avoided.

Additionally, and unexpectedly, it was observed that fiber alignment near the end of the spoke is critical to the spoke's ability to resist compressive and shear failures. By virtue of its ability to be reprocessed, thermoplastic resin facilitates the manipulation of the fibers into a desirable alignment (for best accommodating in-use loads), whereas fibers within a thermoset-based composite spoke are fixed in place after molding.

Embodiments in accordance with the present teachings for creating a non-threaded, mechanical-interlocking geometry for a thermoplastic-based composite spoke do so via in-situ material-addition techniques. Methods described herein provide a way to locally increase the effective diameter at the end of a thermoplastic-based composite spoke to create an interlock with the internal configuration of the end fitting. The present methods, which incorporate additional material to the tip of the (previously molded) spoke, are performed in-situ, which in the present context means the spoke-end geometry is created using the internal geometry of the end fitting as a form. This material-addition process, wherein the previously molded, thermoplastic-based spoke is reheated for the incorporation of additional material (while also achieving desirable fiber alignment), is inapplicable to thermosets.

The methods described herein are agnostic to the geometry of the end fitting. In other words, the local increase in effective diameter of the spoke end to create a mechanical interlock can take the form of a taper, truncated cone, step, or the like. And by virtue of these methods, the end of the spoke will have a desirable fiber alignment.

Material-addition methods described herein include those that are: 1) tool independent, and 2) tool dependent. Tool-dependent embodiments require the use of mold tooling per applicant's prior-art compression-molding technology, whereas tool-independent embodiments do not. Both embodiments utilize the end fitting itself as a form for creating, in-situ, a desired spoke-end geometry.

In the case of some hub designs, the mechanical coupling between the hub and the spoke utilizes an end fitting, but that end fitting might have a different external form factor than the end fitting that couples the spoke to the wheel. In accordance with some embodiments of the invention, notwithstanding any differences in the external form factor of these two types of end fittings, the internal geometry thereof is designed to be the same. This enables both ends of the spoke to have same physical form.

In some other embodiments, the internal geometry of the two different types of end fittings may be different, such that the geometry of one end of the spoke is different from that at the other end of the spoke.

And in some further embodiments, the spoke couples to the hub without the use of an end fitting. In some of these embodiments, the spoke can be (initially) molded to couple to the hub without further modification. In some other of these embodiments, the spoke can be processed in the manner of the present invention, but using a die or other forming tool (rather than an end fitting) to appropriately modify one end of the spoke to couple to the hub. To maintain a focus on features that are germane to the present invention, which pertain to creating a mechanical interlock between a spoke and an end fitting, no further description of conforming a spoke for direct coupling to a hub is provided herein.

In some embodiments, the spoke assembly described herein is designed to exhibit a ductile failure mode (substantial deformation before fracture), as opposed to a brittle failure mode (very small or no plastic deformation prior to fracture), so that the bicycle wheel does not fail catastrophically. The intent is to have the end fitting and possibly the enlarged/coupled end of the spoke deform such that the tension is released in the associated spoke.

BRIEF DESCRIPTION OF THE DRAWINGS

FIG. 3A depicts a block diagram of a method for forming a thermoplastic-based composite spoke in accordance with the present teachings.

FIG. 3B depicts a block diagram of a first tool-independent method for accomplishing operation S303 of the method of FIG. 3A.

FIG. 7 depicts a cross-sectional view of a portion of a third molding tool and a third tool-dependent method for fabricating a thermoplastic-based spoke having a mechanical interlock for coupling to an end fitting.

FIG. 8 depicts a force diagram for the mechanical interlock achieved via the present methods.

DETAILED DESCRIPTION

Figure 1:
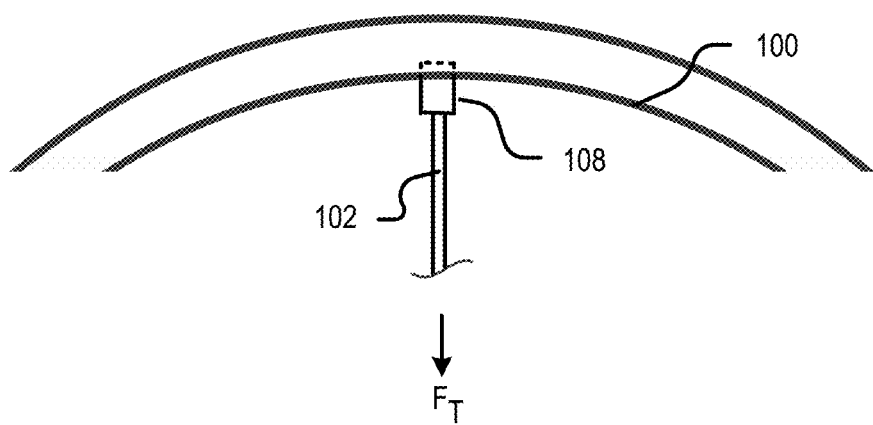
FIG. 1 depicts a portion of a conventional bicycle wheel, and the force on the spoke thereof.

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. Unless otherwise explicitly specified herein, the figures comprising the drawing are not drawn to scale.

The following terms are defined for use in this Specification, including the appended claims:

"Fiber" means an individual strand of material. A fiber has a length that is much greater than its diameter.

"Fiber bundle" means plural (typically multiples of one thousand) co-aligned fibers.

"Stiffness" in the context of a material means resistance to bending, as measured by Young's modulus.

"Tow" means a bundle of fibers (i.e., fiber bundle), and those terms are used interchangeably herein unless otherwise specified. Tows are typically available with fibers numbering in the thousands: a 1K (1000 fibers) tow, 4K (4000 fibers) tow, 8K (8000 fibers) tow, etc.

"Prepreg" means fibers that are impregnated with resin.

"Towpreg" means a fiber bundle (i.e., a tow) that is impregnated with resin.

"Preform" or "Fiber-bundle-based Preform" means an intentionally dimensioned and shaped bundle of fibers, that is impregnated with resin. The preforms are typically sourced from towpreg, but may be the output of resin-impregnation process. Preforms are preferably, but not necessarily, substantially circular/oval in cross section. Preforms are not tape/ribbon, sheets, or laminates.

"Preform Charge" means an assemblage of preforms that are at least loosely bound together (i.e., tacked) so as to maintain their position relative to one another. Neither the preforms, nor the resulting preform charge, are fully consolidated. Alternatively, a preform charge can be a 3D-printed structure, which may include a single, continuous length of filament, or multiple filaments (i.e., fiber discontinuities in the print path).

"Consolidate", "consolidating", or "consolidation" means, in the present context, that in a grouping of fibers/resin, such as plurality of preforms, void space is removed to the extent possible and as is acceptable for a final part. When consolidated, feed structures lose any unique or individual identity and any previously existing boundaries (between adjacent preforms or other feed structures) are lost. This usually requires significantly elevated pressure, which, for applicant's processes, is accomplished via fluid (e.g., gas, hydraulic oil, etc.) pressurization or the mechanical application of force, and elevated temperature (to soften/melt the resin). The pressure differential attainable via processes that utilize vacuum is wholly inadequate to consolidate the applicant's preform-based feed constituents.

"Partial consolidation" means, in the present context, that in a grouping of fibers/resin, void space is not removed to the extent required for a final part. As an approximation, one to two orders of magnitude more pressure is required for full consolidation versus partial consolidation. As a further very rough generalization, to consolidate fiber composite material to about 80 percent of full consolidation requires only 20 percent of the pressure required to obtain full consolidation. Preform charges, for example, are not fully consolidated.

"Compatible" means, when used in reference to two or more polymer resins, that the materials will mix and bond with each other.

"About" or "Substantially" means +/−20% with respect to a stated figure or nominal value.

Other definitions may be provided elsewhere in this specification, in context.

Embodiments of the invention pertain to a thermoplastic-based, fiber-composite bicycle spoke, a combined bicycle spoke and end fitting, and methods relating to the fabrication of the spoke suitable for providing an interlocking geometry between the spoke and an end fitting that receives it. The mechanical engagement between spoke and end fitting cannot be a threaded coupling, and the composite spoke cannot utilize a thermoset resin.

Composite (both thermoset and thermoplastic) bicycle spokes require end fittings made of metal (usually stainless steel or aluminum) to properly assemble to the wheel and hub. The end fitting that couples the spoke to the wheel and the end fitting that couples the spoke to the hub typically possess different outer geometries to accommodate assembly requirements unique to these different wheel components. However, the inner geometry that interfaces with the composite spoke is generally consistent for both types of end fittings. As the present invention pertains to creating a mechanical interlock with an end fitting via its inner geometry, references to "end fitting" are understood to apply equally to both the wheel-based end fitting and the hub-based end fitting.

The inner geometry of the end fitting and the geometry of the spoke-end are specifically shaped to create a mechanical interlock when the spoke is in tension. While in use, the tensile loading on the spoke will pull the spoke away from the end fitting at either end thereof. The interlock created between the spoke and end fitting prevents their separation under this tensile load.

FIG. 1 depicts the well-known arrangement of (a portion of) bicycle wheel 100, and (a portion of) spoke 102, wherein the end of the spoke is coupled to end fitting 108. The figure depicts tensile force $F_T$ experienced by the spoke near to the wheel.

Figure 2:
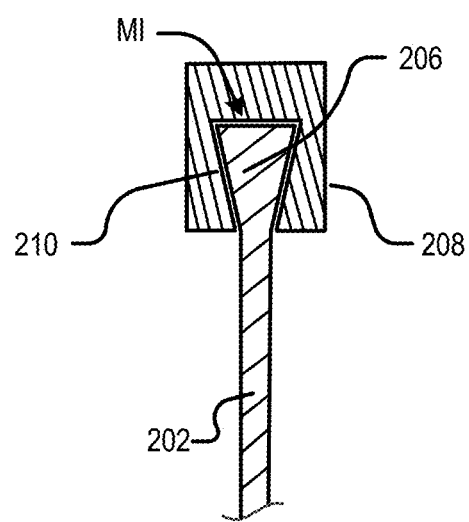
FIG. 2 depicts, via a cross-sectional view, a mechanical interlock between a thermoplastic-based composite spoke and an end fitting in accordance with the present teachings.

In accordance with the present teachings, FIG. 2 depicts an illustration of a mechanical interlock MI formed between the end of spoke 202 and end fitting 208, for resisting tensile force $F_T$ on the spoke. Spoke 202 comprises a thermoplastic resin, such as, for example and without limitation, a bio-based nylon, or nylon generally, polycarbonate, or other medium to high-grade engineering thermoplastics, and fibers, such as carbon fiber or aramid fiber.

Under the applied tension, spoke 202 and the wheel (not depicted in FIG. 2) are prevented from disengaging from one another due to the mechanical interlock arising between internal geometry 210 of end fitting 208, and a complementary "engagement feature" 206 at the end of the spoke. In the illustrative embodiment, internal geometry 210 is configured as a wedge-shape (conical in 3 dimensions) opening, and engagement feature 206 has a corresponding wedge-shape form that is dimensioned to fit tightly within end fitting 208.

FIG. 3A depicts a block diagram of method 300 for forming a thermoplastic-based composite spoke in accordance with the present teachings. The method is generic in the sense that some embodiments of method 300 are tool independent, wherein the only surface(s) that are utilized to form the geometry of the spoke-end is the internal structure of the end fitting itself; no mold tooling is required. And some other embodiments of method 300 are tool dependent, wherein an additional molding tool is used to form the geometry of the spoke-end.

In accordance with operation S301 of method 300, a spoke is formed from thermoplastic resin and fibers. At this point in the process, the spoke-ends will not possess a geometry that is any different from the overall spoke. That is, the spoke-end does not possess a form factor suitable for creating a mechanical interlock with an end fitting. In some embodiments, the spoke is formed via a compression-molding process, using fiber-bundle-based preforms as the feed constituent. In some other embodiments, other forming methods known to those skilled in the art are suitably used.

Per operation S302, an end fitting is positioned proximate to an end of the spoke, wherein a portion of the spoke passes through the end fitting, the spoke extending a short distance (c.a., in the range of about 10 to 25 millimeters) beyond the end of the end fitting. As part of this operation, the end of spoke is square-cut free of burrs.

Figure 4A:
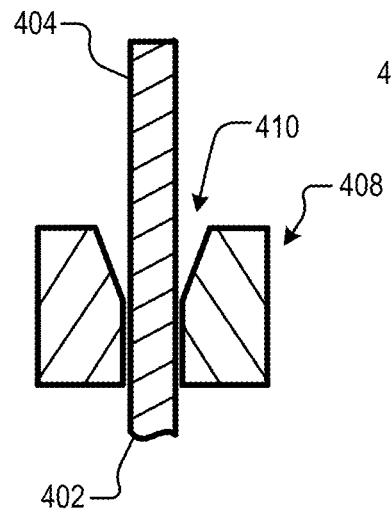
FIG. 4A depicts an operation of the method of FIG. 3A.

FIG. 4A depicts operation S302, wherein end fitting 408 is positioned proximate to spoke end 404. A portion of spoke 402 (spoke shown in partial section) passes through end fitting 408, such that the final 10-25 millimeters (mm) of the spoke extends beyond the end fitting. In this embodiment, as depicted in the cross-sectional views of FIGS. 4A through 4F, the internal geometry of end fitting 408 is characterized by cavity 410 having a conical shape. In other embodiments, the internal geometry/cavity of the end fitting may have other shapes/geometries, as long as they are suitable for establishing a mechanical interlock, as discussed further below.

In operation S303, an engagement feature is formed at the end of the spoke by conforming added thermoplastic resin to an internal geometry of the end fitting. This operation can be accomplished in a tool-independent manner or a tool-dependent manner, as described further below. FIG. 3B depicts a block diagram, and FIGS. 4B-4D depict, via cross-sectional views, a tool-independent methodology for carrying out operation S303.

Referring to FIG. 3B, per operation S303-1, the end of the (linear) spoke is flared, creating a gap or pocket between some of the fibers at the end of the spoke.

Figure 4B:
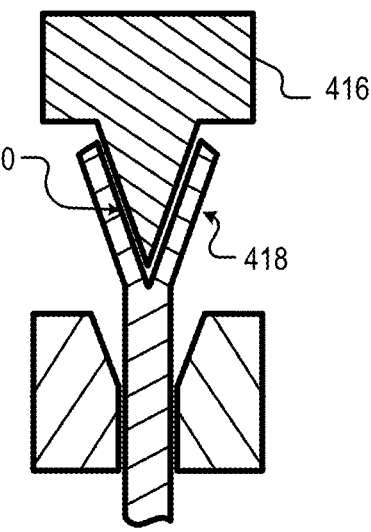
FIGS. 4B-4F depict sequential operations for implementing the first tool-independent method of FIG. 3B.

In the embodiment depicted in FIG. 4B, operation S303-1 is performed using shaping element 416, a portion of which has a conical shape. Shaping element 416 is heated and pressed, with relatively minimal pressure, against the tip of spoke end 404. The temperature of shaping element 416 is sufficient to raise the temperature of the resin matrix of spoke end 404 to the point at which it becomes deformable under load (i.e., the heat deflection temperature of the thermoplastic resin used in the spoke). With minimal applied pressure, shaping element 416 flares 418 the spoke-end, creating "pocket" 420. Shaping element 416 is coaxially aligned with spoke 402 in order to form a radially symmetric geometry, which, in this case, results in a conical-shape for pocket 420. In some embodiments, pocket 420 has a depth in a range of about 10-20 mm. After pocket 420 is formed, shaping element 416 is removed.

Figure 4C:
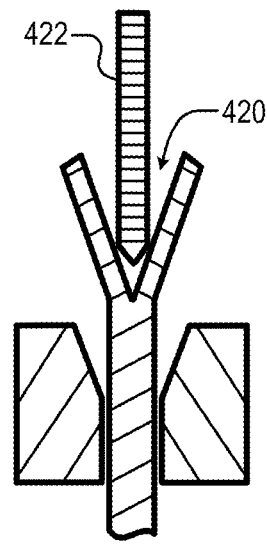
Figure 4D:
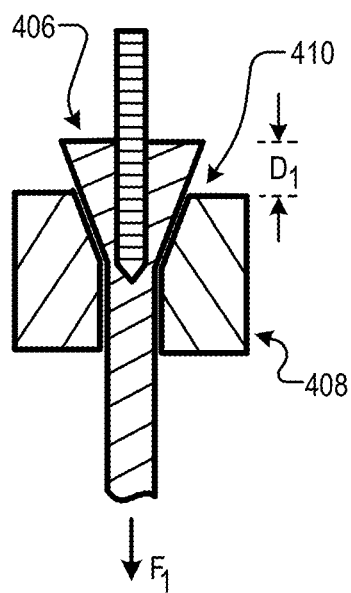

After removing the shaping element, one or more fiber-bundle-based preforms 422 are inserted into pocket 420, in accordance with operation S303-2, and as depicted in FIG. 4C. Preform(s) 422 constitute the additional material necessary to form a localized increase in the effective diameter of spoke end 404 to facilitate mechanical interlock with end fitting 408.

In some embodiments, preform(s) 422 are modified to have a pointed tip, as depicted in FIG. 4C, for interfacing with (conical-shape) pocket 420. This will enable preform 422 to better seat within pocket 420 than if applicant's standard fiber-bundle-based preform, which has blunt ends (for example, as nominally cut from towpreg), were used.

In some other embodiments, the added material, while having the form factor of the fiber-bundle-based preform (although "pointed" or "harpoon like" as per FIG. 4C), is composed of resin and milled fiber, or neat resin (i.e., no fiber), as opposed to the co-aligned, continuous fibers normally present in applicant's fiber-bundle-based preforms. The polymer resin used in both of these alternative embodiments may be dissimilar (although necessarily compatible) to the resin used to form the bulk of spoke 402.

In operation S303-3, the added fiber and thermoplastic resin (preform) 422 and flared end 418 of the spoke are heated to unite them. In FIG. 4D, energy/heat has been applied to both flared end 418 of the spoke as well as to fiber-bundle-based preform 422 to heat them to the melt-processing temperature of the thermoplastic resin. Heat may be applied convectively (e.g., blowing hot air, etc.) or radiatively (e.g., IR, etc.).

During heating, the preform(s) 422 must be appropriately constrained so that they remain in pocket 420. However, preform(s) 422 must not be compressed, which would cause undesirable deformations in the engagement feature being formed at spoke-end 404. For example, with its pointed end nestled in pocket 420, preform 422 is mechanically held in place at its other end, such that it remains coaxial with the long axis of the spoke. More particularly, preform(s) 422 may be fed through a tube that stabilizes it so that it remains coaxial with the spoke, while its pointed tip is advanced into pocket 420.

Typically, but not necessarily, spoke 402 and preform(s) 422 will be formed from the same thermoplastic polymer. If two different resins are used, those resins must be compatible with one another (i.e., the resins are able to mix and bond to one another).

After adequate and even heating at the melt-processing temperature, flared end 418 and preform(s) 422 begin to merge to form a unitary body, which is nascent engagement feature 406. As depicted in FIG. 4D, the flared ends/preform(s) of engagement feature 406 are displaced (in unison) downwardly into conical-shape cavity 410 via force $F_1$. This results in the conical form of the engagement feature. Alternatively, the force may be applied to end fitting 408 in the opposite direction (i.e., upwardly in FIG. 4D) to the same effect. A portion, having a length $D_1$, of nascent engagement feature 406 remains outside of end fitting 408. For pedagogical purposes, in FIGS. 4D-4F, the portion of preform 422 within the now-conical shape of the (original) spoke end 404 is depicted as maintaining its original form and being structurally "distinct" from the "original" spoke material. In fact, they are not distinct at this point in the processing; rather, they are indistinct. The preform is depicted in its original form to emphasize the fact that material has been added to the spoke end.

Figure 4E:
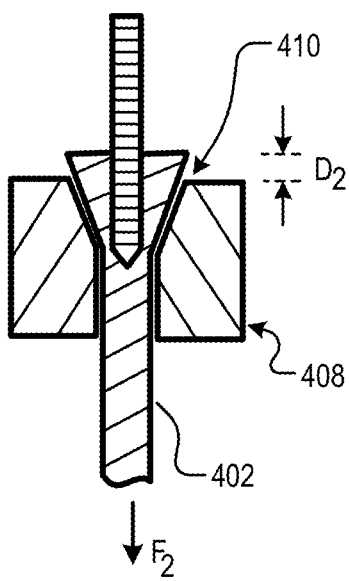

Returning now to method 300, in operation S304, the spoke is preloaded by forcing the engagement feature further into the cavity within the end fitting. In a tool-independent methodology, operation S304 may be accomplished as depicted in FIG. 4E, which is a continuation of the methodology depicted in FIGS. 4A-4D. That is, as depicted in FIG. 4E, once engagement feature 406 is seated in cavity 410 and cooled, force F2 is applied to spoke 402 to force the engagement feature a bit further into cavity 410 of end fitting 408. Alternatively, the force may be applied to end fitting 408 in the opposite direction, and to the same effect.

Figure 4F:
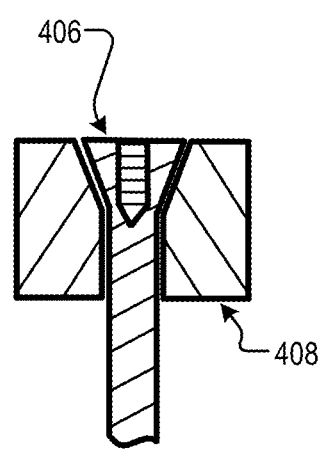

As a result, a smaller portion of engagement feature 406, having a length $D_2$, now remains outside of end fitting 408. This operation generates significant compressive stress in engagement feature 406, creating a preload that helps to ensure consistent stiffness across multiple spokes produced via the present teachings. Force $F_2$, which may be in a range of about 1500-3000 Newtons, is typically two orders of magnitude greater than force $F_1$. The larger force is required because, while still molten (i.e., FIG. 4D), engagement feature 406 requires far less force to seat in cavity 410 than to preload it therein once cooled. As depicted in FIG. 4F, excess material (i.e., material extending beyond end fitting 408) is trimmed from engagement feature 406, such that the end of engagement feature 406 is flush with the end of end fitting 408.

It is notable, and very desirable, that the methodology depicted in FIGS. 4A through 4F preserves the substantially unidirectional (more accurately, co-aligned) fiber alignment in the flared end. As an alternative, a swaging process was trialed, in which the engagement feature was formed by heating the spoke-end and simply compressing it against a hard stop to create a local increase in effective diameter. This approach resulted in a loss of unidirectional fiber alignment (the fibers ends were substantially non-aligned with respect to one another), which had a deleterious effect on spoke performance. That is, the spoke failed prematurely during testing.

Figure 5A:
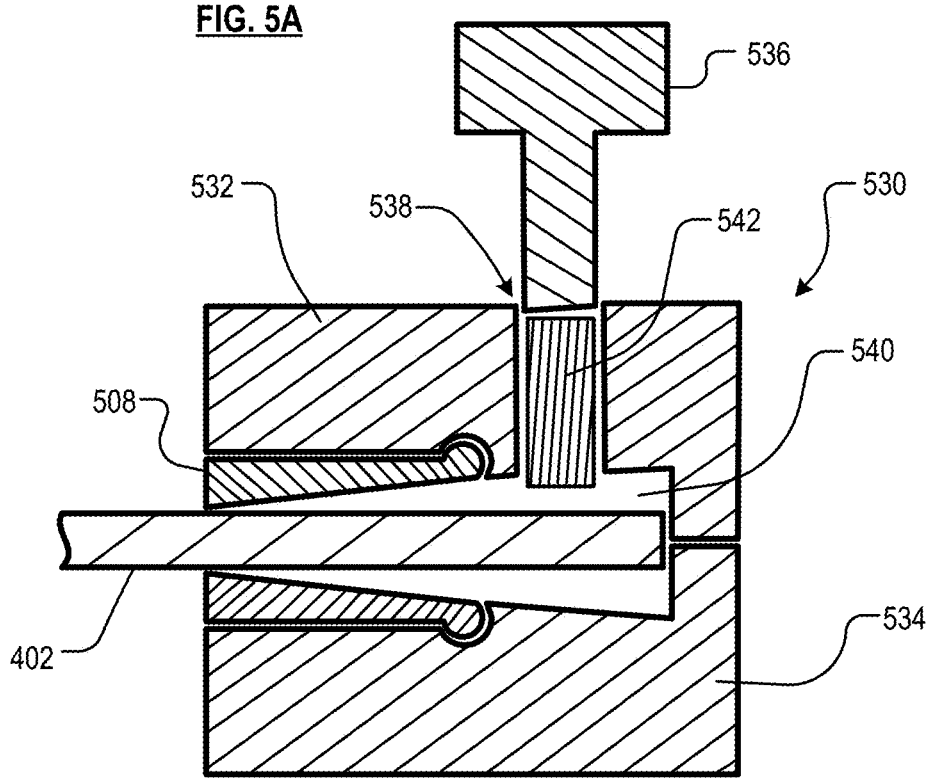
FIGS. 5A-5B depict cross-sectional views of a portion of a first molding tool and a first tool-dependent method for fabricating a thermoplastic-based spoke having a mechanical interlock for coupling to an end fitting.
Figure 5B:
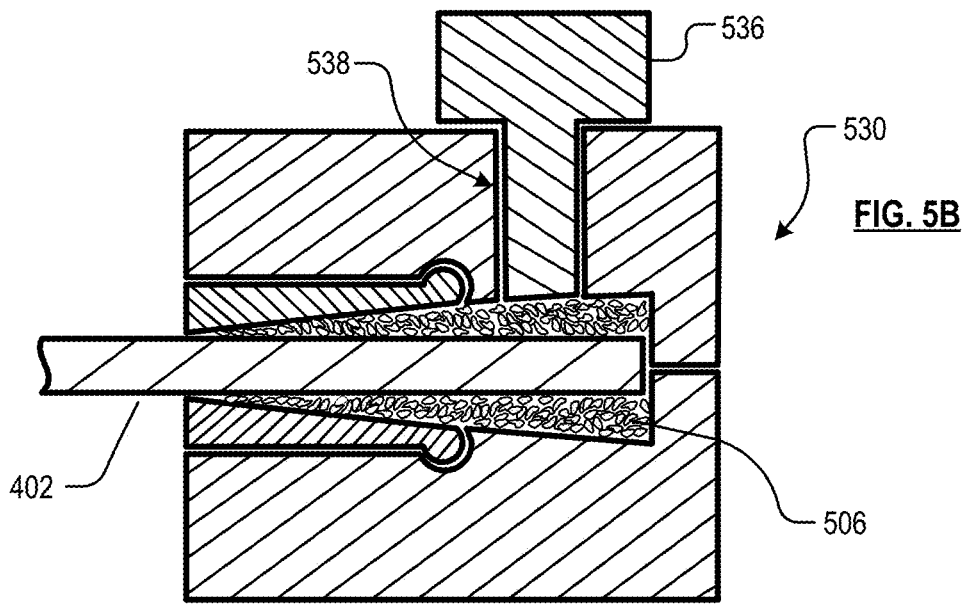

FIGS. 5A and 5B depict a first tool-dependent methodology for carrying out operations S302 and S303. In the illustrative embodiment, a compression-molding process is used to conduct the molding operation.

FIG. 5A depicts the molding setup before molding occurs. Per operation S302, end fitting 508 is first slid over an end of spoke 402 and then placed in mold tool 530. The end of spoke 502 extends beyond end fitting 508 by a distance of at least about 20 mm. In this illustrative embodiment, mold tool 530 includes A-side 532, B-side 534, and plunger 536. A-side 532 and B-side 534 are fixed together via pressure or mechanical means to form closed mold cavity 540. It is notable that only a portion of mold 530 is depicted; mold 530 is a closed mold, wherein the complete length of the spoke is within the mold cavity during molding operations. However, only the end of spoke 402 (i.e., the end within end fitting 508 and the portion extending further to the "right" in FIG. 5B) and feed 542 are heated sufficiently to reach melt-flow state for molding operations. In fact, cooling may be applied to the main portion of spoke 402 to account for any heat that is conducted through the spoke.

Plunger 536, which is disposed orthogonally to spoke 502, is allowed to slide freely in plunger cavity 538 in A-side 532. Feed 542 is added to mold 530 to create engagement feature 506 (FIG. 5B). Feed 542 may include, in various embodiments, fiber-bundle-based preforms, preforms that include milled fiber, preforms that consist of thermoplastic polymer only, pellets (bulk molding compound or sheet molding compound), or a combination thereof. The feed can be loose, or partially consolidated into a preform charge. In a preform charge, the feed constituents (if in the form of a preform) are "tacked" to one another, forming a unitary mass, although the individual components thereof, e.g., preforms, etc., substantially retain their original form since the tacking operation simply softens the resin, rather than melting it to any appreciable extent. Thus, during the formation of a preform charge, the feed constituents are raised to their heat deflection temperature or slightly above it, but typically not to a temperature at which the resin liquefies and flows freely. The volume of feed 542 is sufficient to completely fill mold cavity 540.

FIG. 5B depicts operation S303, forming engagement feature 506 by conforming the added material (i.e., feed 542) to the shape of the internal geometry of end fitting 508.

Mold tool 530 (in the vicinity of end fitting 508) is heated to a temperature that causes the thermoplastic material of the end of composite spoke 502 and feed 542 to flow (i.e., the melt-processing temperature of the thermoplastic resin). Pressure is concurrently or subsequently applied to plunger 536 to force feed 542 into mold cavity 540. The feed flows into and fills the taper in end fitting 508, and fills the remaining open space in cavity 540 (i.e., open space to the "right" of end fitting 508 in FIG. 5B; resin does not flow to the left of end fitting 508). Both the end of spoke 502 and feed 542 are at a sufficient temperature to cause a bond to form between the resins from each.

Following the molding operation, mold 530 is disassembled to remove the spoke assembly (i.e., spoke 402 with end fitting 508 engaged thereto). End fittings can be affixed to one or both ends of spoke 402 via the process described above.

The spoke is then preloaded to a minimum proof load to set the taper of the end fitting 508, via the same approach as for the tool-independent methodology. In this context "set the taper" means to take out any mechanical "slack" in the mechanical interlock. Additional load can be applied to spoke 502 to fix end fittings 508 at a pre-determined separation (per wheel to hub separation). Following the proof load and optional length setting, any material extending beyond the end of end fitting 508 (that couples to a bicycle wheel or hub) is trimmed flush.

Like the embodiment depicted in FIGS. 4A-4F, during/after molding operations, the end of spoke 402 and feed 542 lose their original form and are no longer distinguishable from one another, forming a unitary body. In FIG. 5B, the spoke end is depicted in its original form to highlight the fact that material has been added to create engagement feature 506

FIGS. 6A through 6D depict a second tool-dependent methodology for carrying out operations S302 and S303. In the illustrative embodiment, a compression-molding process is used to conduct the molding operation.

Figure 6A:
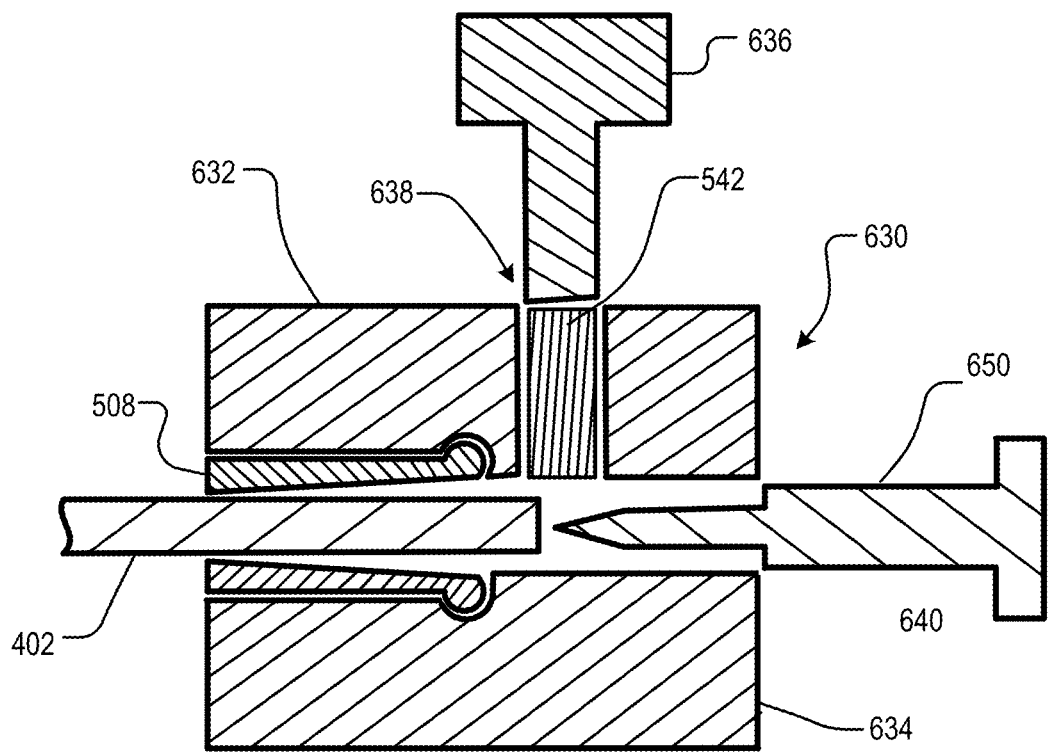
FIGS. 6A-6D depict cross-sectional views of a portion of a second molding tool and a second tool-dependent method for fabricating a thermoplastic-based spoke having a mechanical interlock for coupling to an end fitting.

FIG. 6A depicts the molding setup before molding occurs. Per operation S302, the end fitting is first slid over an end of the spoke and then placed in a mold tool. The end of the spoke extends beyond the end of the end fitting by a distance of at least about 20 mm. In this illustrative embodiment, mold tool 630 includes A-side 632, B-side 634, plunger 636, and core pin 650. The A-side and B-side are fixed together via pressure or mechanical means to form a closed cavity. Plunger 636 slides through plunger cavity 636 disposed in A-side 632 to advance feed 542 into the mold cavity. Core pin 650 slides freely in an opening that is oriented co-axially with spoke 402, for the purpose of flaring the end of the spoke.

In the depicted embodiment, core pin 650 has a pointed end, but may have any appropriate geometry to form a desired pocket shape in the end of spoke 402. Feed 542 includes preforms, as previously discussed, pellets (bulk molding compound or sheet molding compound), or a combination thereof. Feed 542 can be loose, or partially consolidated into a preform charge. The volume of the feed is sufficient to completely fill the empty cavity space in the mold.

Figure 6B:
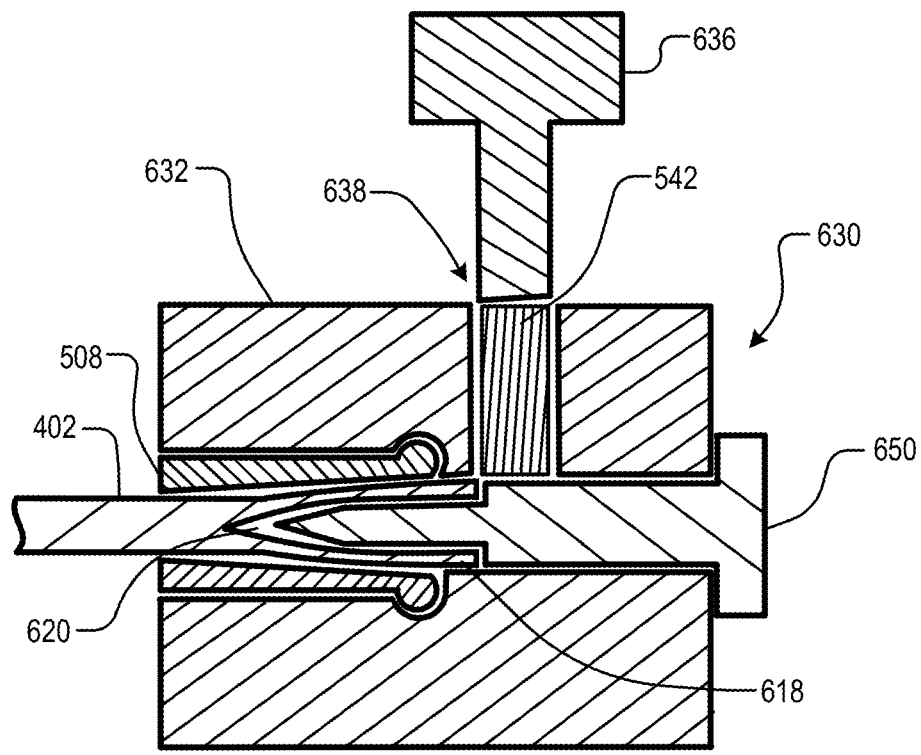

In FIG. 6B, the mold has been heated to a temperature that causes the thermoplastic resin of the end of composite spoke 402 and feed 542 to flow (i.e., the melt processing temperature of the thermoplastic resin). Pressure is concurrently or subsequently applied to core pin 650 to force the core pin into the end of spoke 402 to flare 618 the spoke-end, creating pocket 620. Core pin 650, which is coaxially aligned with spoke 402, forms a radially symmetric geometry in the spoke end. In some embodiments, pocket 620 created by core pin 650 has a depth that is in a range of about 10-20 mm. After pocket 620 is formed, core pin 650 is retracted. Core pin 650 is actuated by a mechanical force that is applied by a source other than the compression molding press (not depicted).

Figure 6C:
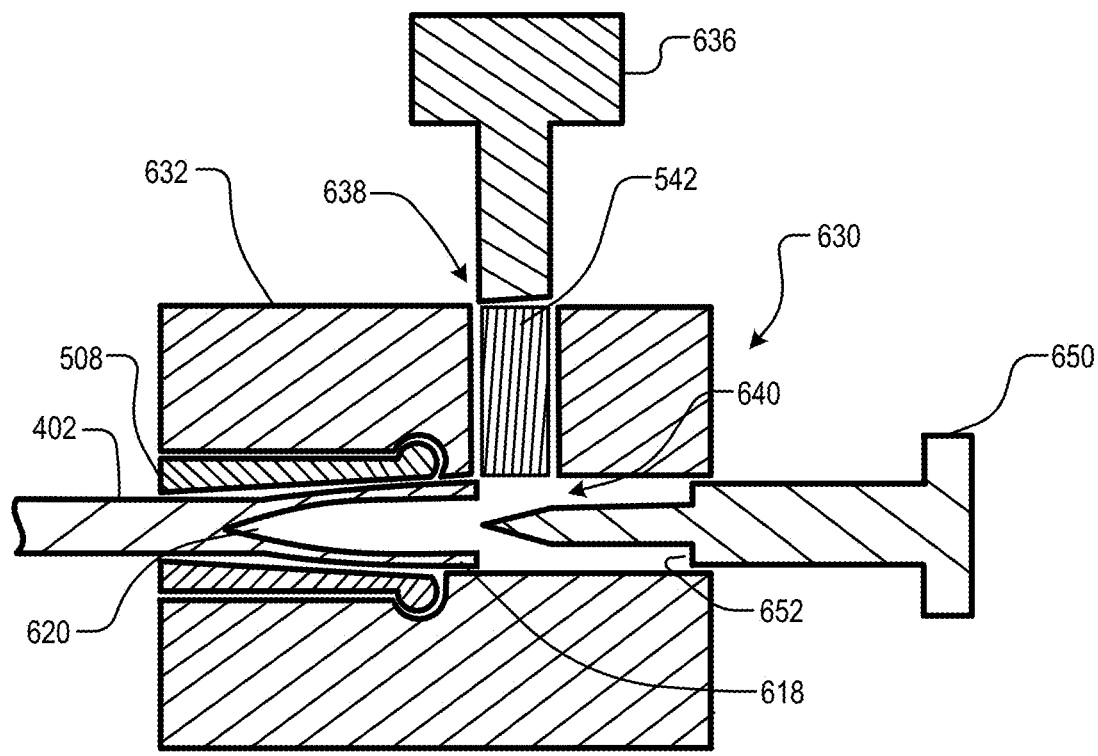
Figure 6D:
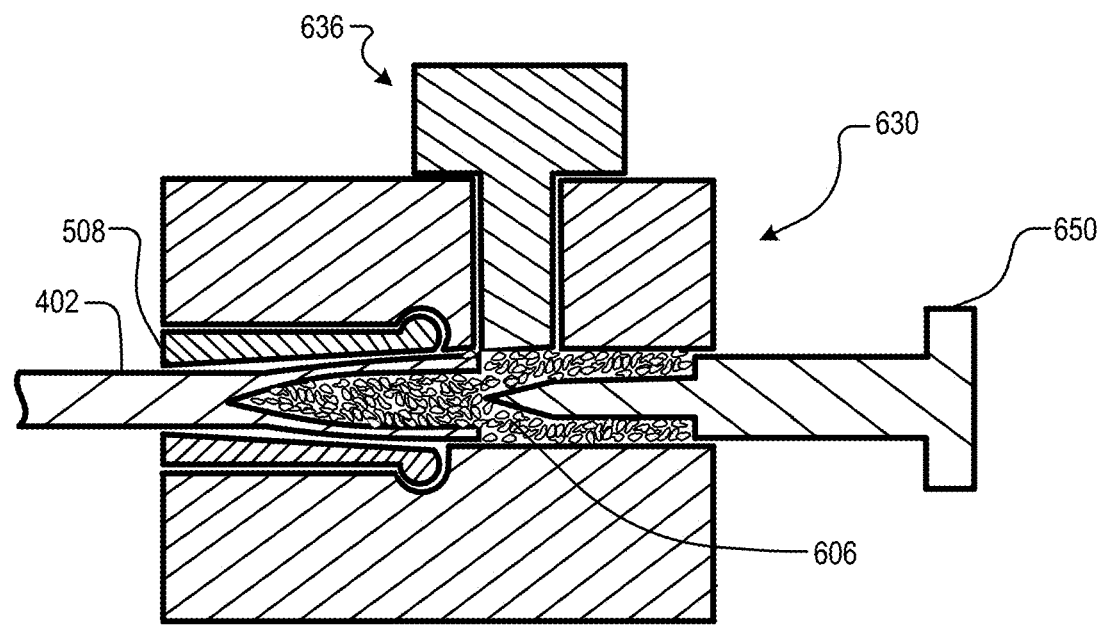

In FIG. 6C, core pin 650 is partially retracted, ensuring cavity 640 is formed. Referring now to FIG. 6D, force is applied to plunger 636 to flow the now liquefied feed 542 into pocket 620 in the end of spoke 402 and fill any remaining empty volume in the mold cavity (to the "right" of end fitting 508). Both the end of the spoke and feed 542 are at a sufficient temperature to cause a bond to form therebetween. Following the molding cycle, the mold is disassembled to remove the spoke assembly (i.e., spoke 402 with engagement feature 606 coupled to end fitting 508).

As appropriate, end fittings are fixed to both ends of the spoke to create the spoke assembly, per the above-described method. The spoke assembly is then preloaded to a minimum proof load to set the taper. Additional load can be applied to spoke 402 to fix end fittings 508 at a pre-determined separation from one another (per wheel to hub separation). Following the proof load and length setting, any material remaining proud of the ends of the end fittings is trimmed to be flush with the end of the end fittings.

A third tool-dependent methodology for carrying out operations S302 and S303 is described in conjunction with FIG. 7.

As per the previous tool-dependent embodiments, per operation S302 and FIG. 7, end fitting 508 is first slid over an end of spoke 402 and then placed in mold tool 730. Spoke 402 extends beyond end fitting 508 by at least about 20 mm.

In this embodiment, mold tool 730 includes A-side 732, B-side 734, plunger 736, and core pin 750. A-side 732 and B-side 734 are fixed together via pressure or mechanical means to form a closed cavity. Core pin 750 slides freely in opening 756 that is oriented co-axially with respect to spoke 402. In the depicted embodiment, core pin 750 has a pointed end, but may have any appropriate geometry to form a desired pocket shape in the end of the spoke. In this embodiment, core pin 750 includes lumen 754, which serves as a plunger cavity for plunger 736. A feed, not depicted, is placed in lumen 754.

As in previous embodiments, the feed may be composite or neat resin preforms, pellets (bulk molding compound or sheet molding compound), or a combination thereof. The feed can be loose, or partially consolidated into a preform charge. The volume of the feed is sufficient to completely fill the empty cavity space in the mold.

The appropriate portion of mold tool 730 is heated to a temperature that causes the thermoplastic resin at the end of composite spoke 402 and the feed to flow (i.e., the melt processing temperature of the thermoplastic resin). Pressure is concurrently or subsequently applied to core pin 750 to force the core pin into spoke 402 to flare 718 the end thereof, creating pocket 720. Core pin 750 is coaxially aligned with spoke 402 in order to form a radially symmetric geometry in the end of the spoke. In some embodiments, pocket 720 created by core pin 750 has a depth in a range of about 10-20 mm. After pocket 720 is formed, feed is injected therein through an opening at the end of core pin 750 as plunger 736 is advanced within the core pin. In some alternative embodiments, the core pin may be removed and replaced by plunger to advance the feed into the pocket.

Since the displacement of plunger 736 and core pin 750 is along an axis orthogonal to the axis of compression (unless the spoke is fixtured vertically, which is undesirable), this would embodiment would not be conducted via compression molding press. Rather, the actuation force would come from another mechanical source, such as a linear screw, hydraulics, etc.

Both tool-independent and tool-dependent methods are agnostic to internal geometry of the end fitting. That is, irrespective of the internal geometry for creating an interlock (e.g., taper, truncated cone, stepped, etc.), the methods will each incorporate additional material as necessary to create a local increase in effective diameter of the end of the spoke.

The present inventors recognized that it is beneficial for the spoke assembly described herein to exhibit a ductile failure mode (substantial deformation before fracture), as opposed to a brittle failure mode (very small or no plastic deformation prior to fracture), so that the bicycle wheel does not fail catastrophically. The intent is to have the end fitting deform (increase in diameter) sufficiently so the engagement feature at the end of the spoke become "loose" within the end fitting, thereby releasing the tension in the associated spoke. This is described further below.

FIG. 8 depicts a schematic view of spoke 202 having engagement feature 206 at an end thereof, coupled to end fitting 208. As previously described, a mechanical interlock—in the illustrative embodiment, a "taper" lock—is created between engagement feature 206 and end fitting 208. This reliably fixes spoke 202 to end fitting 208. Spoke tension Fr induces a hoop stress in end fitting 208 due to the taper angle θ. This hoop stress causes a compressive normal force $F_{N,F}$ on end fitting 208. The force due to friction between end fitting 208 and engagement feature 206 increases as a function of normal force: $F_{N,S}=F_{N,F}$, and therefore spoke tension $F_T$.

The load at which plasticity of the end fitting starts to happen can be controlled by altering any of the variables described above, namely:
 (i) taper contact area,
 (ii) end fitting mean radius,
 (iii) end fitting wall thickness,
 (iv) and end fitting yield strength (i.e., end fitting material).

The shape of the plasticity as measured by the load-deflection curve can be influenced most directly by the shape of the plastic portion of the stress-strain curve of the end fitting material.

In various embodiments, the invention provides a method as follows.

Clause 1. A method comprising:
 forming a spoke assembly by creating a mechanical interlock between an end fitting and a first end of a bicycle spoke, wherein the end fitting has an internal geometry characterized by a cavity, and the bicycle spoke comprises a first thermoplastic resin and a first plurality of continuous fibers, and wherein the mechanical interlock is created by:
  (i) melting the first thermoplastic resin at the first end of the bicycle spoke and melting an additional material comprising a second thermoplastic resin, the melted first and second thermoplastic resin filling the cavity;
  (ii) cooling the melted first and second to form an engagement feature that conforms to the internal geometry of the end fitting; and
 preloading the bicycle spoke by forcing the engagement feature a first distance into the cavity.

Clause 2. The method of clause 1 wherein creating the mechanical interlock comprises:
 (i) creating a pocket at the first end of the spoke; and
 (ii) inserting the additional material into the pocket.

Clause 3. The method of clause 2 wherein creating a pocket comprises heating a shaping element that is coaxially aligned with the bicycle spoke, and pressing the shaping element against the first end of the spoke, wherein as a result of the pressing, and proximate to the end of the spoke, a portion of some of the continuous fibers separate from one another thereby flaring the end of the spoke.

Clause 4. The method of clause 3 wherein the shaping element has a conical shape.

Clause 5. The method of any of clauses 1-4 wherein the cavity has a conical shape.

Clause 6. The method of any of clauses 1-5 wherein the additional material includes a second plurality of fibers.

Clause 7. The method of any of clauses 1-6 wherein the second plurality of fibers includes milled fibers.

Clause 8. The method of clause 6 wherein the second thermoplastic resin and the second plurality of fibers are in a form of a fiber-bundle-based preform.

Clause 9. The method of clause 8 wherein an end of the fiber-bundle-based preform is pointed.

Clause 10. The method of any of clauses 1-9 wherein the first thermoplastic resin and the second thermoplastic resin have the same composition.

Clause 11. The method of any of clauses 1-10 wherein the first thermoplastic resin and the second thermoplastic resin are dissimilar, but compatible with one another.

Clause 12. The method of any of clauses 1-5 wherein the additional material consists only of the second thermoplastic resin.

Clause 13. The method of any of clauses 1-12 wherein after the end fitting and the bicycle spoke are coupled to one another, the method comprises placing the coupled end fitting and bicycle spoke in a mold cavity of a molding tool.

Clause 14. The method of clause 13 wherein creating the mechanical interlock comprises injecting the additional material into the mold cavity.

Clause 15. The method of clause 14 wherein injecting the additional material comprises placing the additional material in a plunger cavity, and then advancing the plunger through the plunger cavity.

Clause 16. The method of any of clauses 13-15, wherein creating the mechanical interlock comprises:
 creating a pocket at the first end of the spoke; and
 inserting the additional material into the pocket.

Clause 17. The method of clause 16 wherein creating a pocket at the first end of the spoke comprises forcing a core pin, which is co-axially aligned with the bicycle spoke, into contact with the end of the spoke.

Clause 18. The method of clause 17 wherein inserting the additional material into the pocket comprises:
 heating the additional material sufficiently to melt the second resin; and forcing the heated additional material into the mold cavity via a plunger cavity, wherein the heated additional material flows to fill the pocket.

Clause 19. The method of clause 17 wherein inserting the additional material into the pocket comprises:
heating the additional material sufficiently to melt the second resin; and
forcing the additional material through a lumen in the core pin, wherein the heated additional material flows to fill the pocket.

Clause 20. The method of any of clauses 1-19 wherein a tensile strength of the bicycle spoke exceeds the load at which the end fitting deforms.

Clause 21. The method of any of clauses 6, 8, or 9, wherein the second plurality of fibers in the additional material substantially co-align with the first plurality of fibers of the bicycle spoke.

Clause 22. The method of any of clauses 1-21 comprising forming the bicycle spoke.

Clause 23. A method comprising:
forming a spoke assembly by creating a mechanical interlock between an end fitting and a first end of a bicycle spoke, wherein bicycle spoke comprises a first thermoplastic resin and a first plurality of continuous fibers, and wherein the mechanical interlock is created by increasing an effective diameter of the first end of the bicycle spoke, wherein the effective diameter of the first end of the bicycle spoke is increased by:
(a) melting the first thermoplastic resin at the first end of the bicycle spoke;
(b) melting an additional material comprising a second thermoplastic resin, wherein the melted first and second thermoplastic resin fill a cavity within the end fitting; and
(c) cooling the melted first and second thermoplastic resin to form an engagement feature that conforms to the geometry of cavity.

Clause 24. The method of clause 23 comprising forming the bicycle spoke.

Clause 25. The method of clauses 23 or 24, wherein prior to melting the first and second thermoplastic resins, the first end of the bicycle spoke and the end fitting are arranged so that the first end of the bicycle spoke passes through the end fitting, extending a distance beyond the end fitting.

Clause 26. The method of any of clauses 23-25 wherein a tensile strength of the bicycle spoke exceeds the load at which the end fitting deforms.

Clause 27. The method of any of clauses 23-26 wherein the additional material includes fibers, and wherein the fibers of the additional material substantially co-align with the first plurality of fibers of the bicycle spoke.

Clause 28. The method of any of clauses 23-27 comprising preloading the bicycle spoke, after the mechanical interlock is created, to a desired tension.

Clause 29. A method comprising:
creating a mechanical interlock between an end fitting and a first end of a bicycle spoke, the bicycle spoke comprising a first thermoplastic resin and a plurality of fibers, wherein the mechanical interlock is created by melting the first end of the bicycle spoke, and melting additional material comprising a second thermoplastic resin, the melted first and second thermoplastic resin filling a cavity in the end fitting and increasing an effective diameter of the first end of the bicycle spoke.

Clause 30. The method of clause 29 comprising preloading the bicycle spoke, after the mechanical interlock is created, to a desired tension.

Clause 31. The method of either of clauses 29 or 30 wherein a tensile strength of the bicycle spoke exceeds the load at which the end fitting deforms.

Clause 32. The method of any of clauses 29-31 comprising using the end fitting as a form for shaping the melted first and second thermoplastic resin.

Clause 33. The method of any of clauses 29-32 wherein the additional material includes fibers, and wherein the fibers in the additional material align with the fibers from the spoke.

Clause 34. The method of any of clauses 29-33 wherein the spoke is not made from a thermoset resin, and the added material does not include a thermoset resin.

Clause 35. The method of any of clauses 29-34 wherein the end of the spoke and the additional material, after melting, takes the form of a taper, truncated cone, or stepped geometry.

Clause 36. The method of any of clauses 29-35 wherein melting of the end of the spoke and the additional material, and formation of the mechanical interlock is conducted in the absence of mold tooling.

Clause 37. The method of any of clauses 29-36 wherein melting of the end of the spoke and the additional material, and formation of the mechanical interlock is conducted within a closed mold.

Clause 38. The method of any of clauses 29-37 wherein an end fitting is placed at each of the two ends of the spoke, wherein the end fittings have different external geometries but identical internal geometries.

Clause 39. The method of any of clauses 29-37 wherein an end fitting is placed at each of the two ends of the spoke, wherein the end fittings have different external geometries and different internal geometries.

Clause 40. The method of any of clauses 29-37 comprising molding one end of the spoke to couple directly to the hub of the wheel without further processing.

Clause 41. The method of clause 40 wherein the one end of the spoke is molded using a die or other forming tool but not the end fitting, to couple directly to the hub of the wheel.

Clause 42. The method of any of clauses 29-41 wherein the end fitting is not internally threaded.

Clause 43. The method of any of clauses 29-42 wherein the spoke is initially formed from the first thermoplastic resin and fibers, and the ends of the spoke possess the same geometry as the rest of the spoke.

Clause 44. The method of any of clauses 29-43 wherein the spoke is initially formed via a compression-molding process, using one or more fiber-bundle-based preforms as the feed constituent.

Clause 45. The method of any of clauses 29-34 wherein, in preparation for forming the mechanical interlock, one end of the spoke extends through the end fitting, and extends therefrom by an amount in the range of between about 10 to 25 millimeters.

Clause 46. The method of any of clauses 29-35 comprising flaring the end of the spoke prior to adding additional material to the end of the spoke.

Clause 47. The method of any of clauses 29-36, 38-46 wherein the end of the spoke is flared using a shaping element that is heated and then contacted, at minimal pressure, to the end of the spoke.

Clause 48. The method of clause 47 wherein the shaping element is coaxially aligned with the spoke.

Clause 49. The method of any of clauses 46-48 wherein flaring the end of the spoke creates a pocket, wherein the pocket has a depth of between about 10 to 25 millimeters.

Clause 50. The method of any of clauses 46-49 comprising adding the additional material to the pocket created within the flared end of the spoke.

Clause 51. The method of any of clauses 46-50 wherein the additional material comprises a fiber-bundle-based preform.

Clause 52. The method of clause 51 wherein the fibers in the fiber-bundle-based preform substantially align with the fibers of the flared end of the spoke.

Clause 53. The method of clause 51 wherein the end of the fiber-bundle-based preform is pointed to be retained by the pocket at the end of the spoke.

Clause 54. The method of any of clauses 29-50 wherein the additional material is in the form of a preform that consists of milled fiber.

Clause 55. The method of any of clauses 29-32, 34-50 wherein the additional material is in the form of a preform, but contains only resin.

Clause 56. The method of any of clauses 29-55 wherein the additional material added is not compressed into the pocket.

Clause 57. The method of any of clauses 29-56 wherein, after the melted end of the spoke and the melted additional material has cooled, forcing the cooled material further into the end fitting, creating a preload.

Clause 58. The method of clause 57 wherein the force required is preloading the spoke is in a range of about 1500-3000 Newtons.

Clause 59. The method of any of clauses 29-35, 37-58 wherein when the mechanical interlock is created using a molding tool, applying cooling to the main portion of the spoke to prevent melting of the spoke, other than at the end of the spoke.

Clause 60. The method of any of clauses 29-59 comprising designing the spoke assembly to have a ductile failure mode.

Clause 61. The method of any of clauses 29-60 comprising designing the spoke assembly to ensure that the end fitting deforms before the spoke fails, wherein deformation of the end fitting releases tension on the spoke.

Clause 62. The method of any of clauses 61 wherein designing the spoke assembly to ensure that the end fitting deforms before the spoke comprises altering one of more variables selected from the group consisting of: taper contact area, mean radius of the end fitting, wall thickness of the end fitting, yield strength of the material composing the end fitting.

What is claimed:

1. A method comprising:
   forming a spoke assembly by creating a mechanical interlock between an end fitting and a first end of a bicycle spoke, wherein the end fitting has an internal geometry characterized by a cavity, and the bicycle spoke comprises a first thermoplastic resin and a first plurality of continuous fibers, and wherein the mechanical interlock is created by:
   (i) melting the first thermoplastic resin at the first end of the bicycle spoke and melting an additional material comprising a second thermoplastic resin, the melted first and second thermoplastic resin filling the cavity;
   (ii) cooling the melted first and second to form an engagement feature that conforms to the internal geometry of the end fitting; and
   preloading the bicycle spoke by applying a force to at least one of the engagement feature and the end fitting, wherein the force advances the engagement feature in the cavity, thereby generating compressive stress in the engagement feature.

2. The method of claim 1 wherein creating the mechanical interlock comprises:
   creating a pocket at the first end of the spoke; and
   inserting the additional material into the pocket.

3. The method of claim 2 wherein creating a pocket comprises heating a shaping element that is coaxially aligned with the bicycle spoke, and pressing the shaping element against the first end of the spoke, wherein as a result of the pressing, and proximate to the end of the spoke, a portion of some of the continuous fibers separate from one another thereby flaring the end of the spoke.

4. The method of claim 3 wherein the shaping element has a conical shape.

5. The method of claim 1 wherein the cavity has a conical shape.

6. The method of claim 1 wherein the additional material includes a second plurality of fibers.

7. The method of claim 6 wherein the second plurality of fibers includes milled fibers.

8. The method of claim 6 wherein the second thermoplastic resin and the second plurality of fibers are in a form of a fiber-bundle-based preform.

9. The method of claim 8 wherein an end of the fiber-bundle-based preform is pointed.

10. The method of claim 1 wherein the first thermoplastic resin and the second thermoplastic resin have the same composition.

11. The method of claim 1 wherein the first thermoplastic resin and the second thermoplastic resin are dissimilar, but compatible with one another.

12. The method of claim 1 wherein the additional material consists only of the second thermoplastic resin.

13. The method of claim 1 wherein after the end fitting and the bicycle spoke are coupled to one another, the method comprises placing the coupled end fitting and bicycle spoke in a mold cavity of a molding tool.

14. The method of claim 13 wherein creating the mechanical interlock comprises injecting the additional material into the mold cavity.

15. The method of claim 14 wherein injecting the additional material comprises placing the additional material in a plunger cavity, and then advancing the plunger through the plunger cavity.

16. The method of claim 14 wherein creating the mechanical interlock comprises:
   creating a pocket at the first end of the spoke; and
   inserting the additional material into the pocket.

17. The method of claim 16 wherein creating a pocket at the first end of the spoke comprises forcing a core pin, which is co-axially aligned with the bicycle spoke, into contact with the end of the spoke.

18. The method of claim 17 wherein inserting the additional material into the pocket comprises:
   heating the additional material sufficiently to melt the second resin; and
   forcing the heated additional material into the mold cavity via a plunger cavity, wherein the heated additional material flows to fill the pocket.

19. The method of claim 17 wherein inserting the additional material into the pocket comprises:
   heating the additional material sufficiently to melt the second resin; and forcing the additional material through a lumen in the core pin, wherein the heated additional material flows to fill the pocket.

20. The method of claim 1 wherein a tensile strength of the bicycle spoke exceeds the load at which the end fitting deforms.

21. The method of claim 6 wherein the second plurality of fibers in the additional material substantially co-align with the first plurality of fibers of the bicycle spoke.

22. The method of claim 1 comprising forming the bicycle spoke.

23. A method comprising:
  forming a spoke assembly by creating a mechanical interlock between an end fitting and a bicycle spoke, wherein the bicycle spoke comprises a first thermoplastic resin and a first plurality of continuous fibers and is characterized by a first diameter, wherein the end fitting receives the bicycle spoke proximate to a first end of the bicycle spoke, the end fitting having a first end and a second end, wherein the first end of the bicycle spoke is relatively closer to second end of the end fitting than the first end of the end fitting, and wherein the mechanical interlock is created by increasing the first diameter of the bicycle spoke proximate to the first end thereof by:
  (a) melting the first thermoplastic resin at proximate to the first end of the bicycle spoke;
  (b) melting an additional material comprising a second thermoplastic resin, wherein the melted first and second thermoplastic resin fill a cavity within the end fitting, wherein the cavity has an increase in diameter between the first end and second end of the end fitting; and
  (c) cooling the melted first and second thermoplastic resin to form an engagement feature that conforms to the geometry of cavity, the engagement feature having a diameter that is larger than the first diameter.

24. The method of claim 23 wherein prior to melting the first and second thermoplastic resins, the first end of the bicycle spoke and the end fitting are arranged so that the first end of the bicycle spoke passes through the end fitting, extending a distance beyond the end fitting.

25. The method of claim 23 wherein a tensile strength of the bicycle spoke exceeds the load at which the end fitting deforms.

26. The method of claim 23 wherein the fibers in the additional material substantially co-align with the first plurality of fibers of the bicycle spoke.

27. The method of claim 23 comprising preloading the bicycle spoke, after the mechanical interlock is created, to a desired tension.

28. A method comprising:
  creating a mechanical interlock between an end fitting and a first end of a bicycle spoke, the bicycle spoke comprising a first thermoplastic resin and a plurality of fibers, the end fitting having a cavity wherein a first end of the cavity has a relatively smaller diameter and the second end of the cavity has a relatively larger diameter, and wherein the mechanical interlock is created by melting the first end of the bicycle spoke, and melting additional material comprising a second thermoplastic resin, the melted first and second thermoplastic resin filling the cavity in the end fitting and so that a diameter of the first end of the bicycle spoke is greater than the diameter of the first end of the cavity.

29. The method of claim 28 comprising preloading the bicycle spoke, after the mechanical interlock is created, to a desired tension.

30. The method of claim 28 wherein a tensile strength of the bicycle spoke exceeds the load at which the end fitting deforms.

* * * * *